No. 874,703. PATENTED DEC. 24, 1907.
A. RECTOR.
INCANDESCENT GAS LAMP.
APPLICATION FILED JULY 11, 1906.
2 SHEETS—SHEET 1.
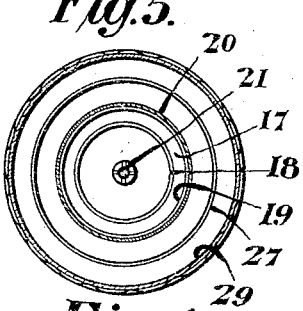
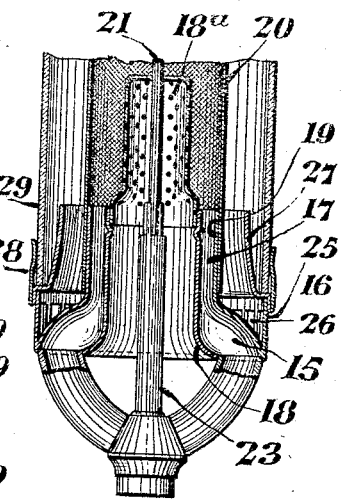
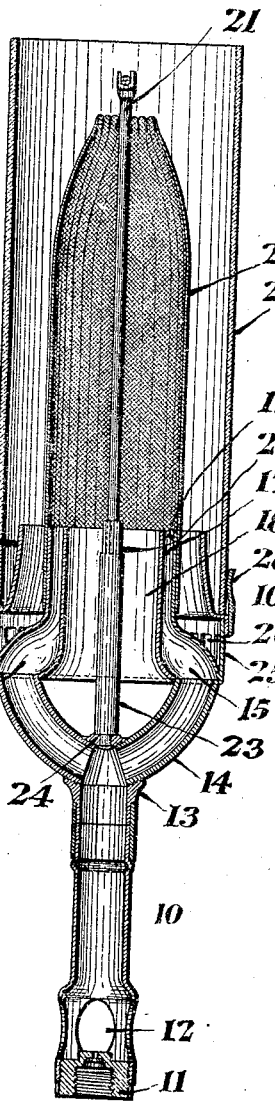
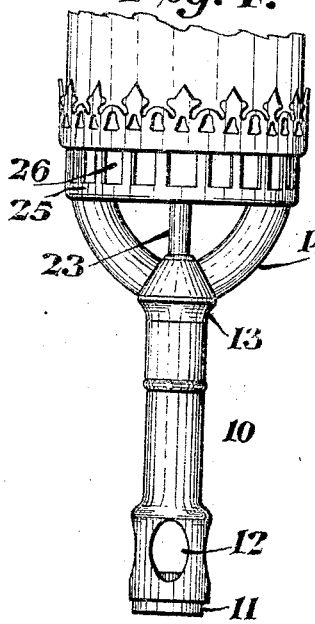
WITNESSES:
A. A. Phipps.
Frank L. Betts.
INVENTOR.
Alcorn Rector
BY
W. R. Hutchinson,
ATTORNEY.
THE NORRIS PETERS CO., WASHINGTON, D. C.

No. 874,703.　　　　　　　　　　　　　　　PATENTED DEC. 24, 1907.
A. RECTOR.
INCANDESCENT GAS LAMP.
APPLICATION FILED JULY 11, 1906.
2 SHEETS—SHEET 2.
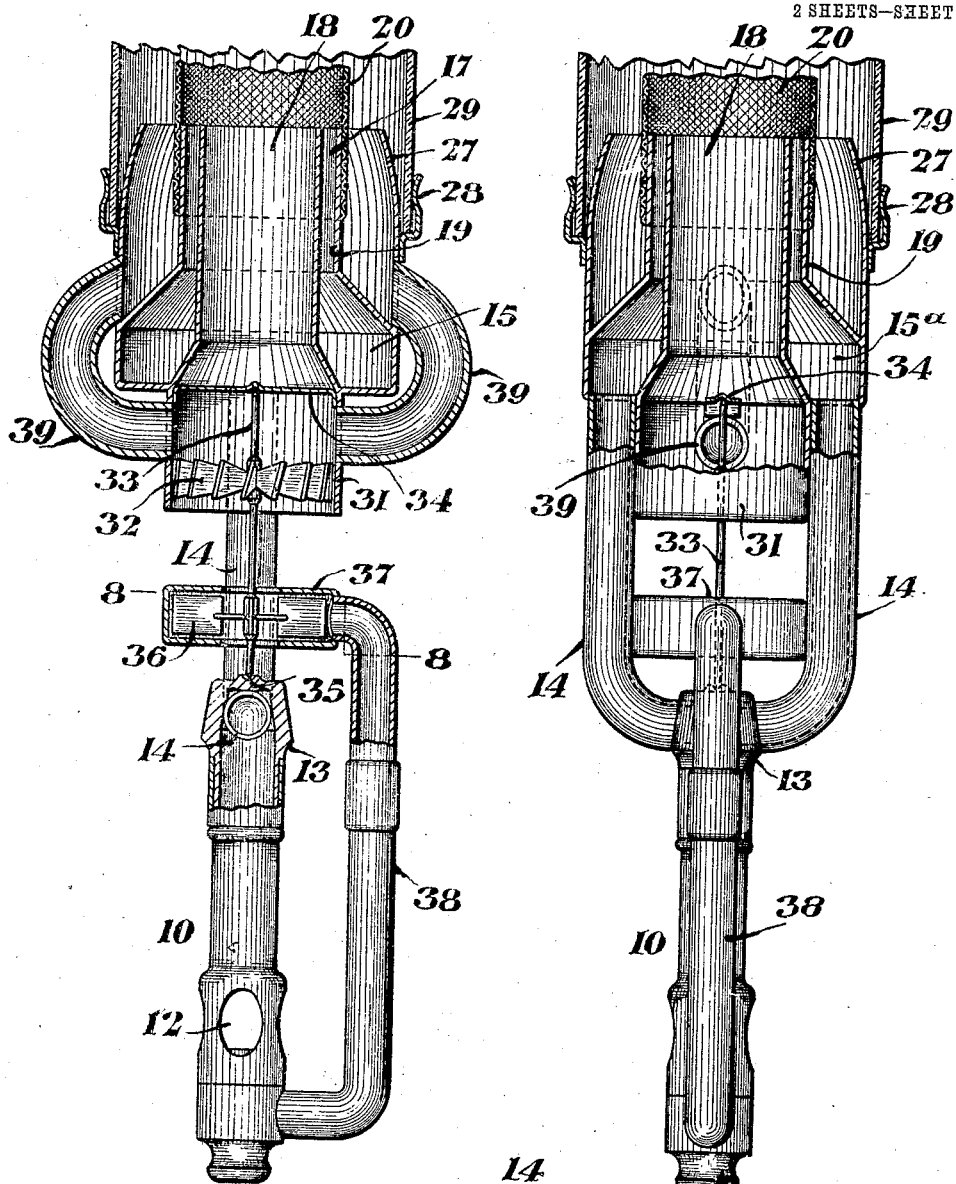
WITNESSES:
A. A. Phipps
Frank L. Stubbs
INVENTOR.
Alcorn Rector
BY W. B. Hutchinson,
ATTORNEY.

UNITED STATES PATENT OFFICE.

ALCORN RECTOR, OF NEW YORK, N. Y., ASSIGNOR TO RECTOR GAS LAMP COMPANY, OF NEW YORK, N. Y., A CORPORATION OF CONNECTICUT.

INCANDESCENT GAS-LAMP.

No. 874,703.   Specification of Letters Patent.   Patented Dec. 24, 1907.

Application filed July 11, 1906. Serial No. 325,686.

*To all whom it may concern:*

Be it known that I, ALCORN RECTOR, of New York city, county and State of New York, have invented a new and Improved Incandescent Gas-Lamp, of which the following is a full, clear, and exact description.

My invention relates to improvements in incandescent gas lamps, and the object of my invention is to produce a gas lamp of very high candle power, and of very high efficiency. In attaining this object I utilize to a certain extent the principle of the Argand burner, except that I use no wick, but I have found that by preparing a large center draft for the burner and arranging the structure so that a large air supply will be delivered both inside and outside the mantle, I can envelop the latter in a flame on both sides, which will heat it to very high incandescence, and will cause it therefore to give an exceedingly brilliant light. I have found further that I can induce a draft during the consumption of gas which will cause such a strong current of air to flow through the center tube or draft tube that the inflow will run a small wind wheel which in turn is capable of operating a blower, and the latter can be made to supply a forced draft for the lamp, thus causing a still higher state of incandescence at the mantle.

With these ends in view my invention consists of an improved incandescent gas lamp, the construction and operation of which will be hereinafter described, and the novel features claimed.

Reference is to be had to the accompanying drawings forming a part of this specification, in which similar letters and figures of reference indicate corresponding parts in all the views.

Figure 1 is a central vertical section of a lamp showing my improvements. Fig. 2 is a broken outside elevation of the same. Fig. 3 is a broken side elevation of a slightly modified form of the lamp. Fig. 4 is a sectional plan of the burner and connected parts. Fig. 5, is a detail sectional view showing a slightly modified form of invention. Fig. 6 is a detail sectional view showing another slight modification of the burner. Fig. 7 is a central vertical section with parts in elevation showing the lamp with the air forcing attachment. Fig. 8 is a sectional plan on the line 8—8 of Fig. 7, and Fig. 9 is a side elevation partly in section of a part of the structure shown in Fig. 7.

The lamp is provided with any suitable bunsen 10 having a nipple 11 for connecting with a gas fixture and air openings 12 as usual. A connection 13 which fits the bunsen tube carries the air and gas supply pipes 14 which diverge from the bunsen and deliver into the inwardly projecting extensions 15 which form a part of the burner 16 and the latter may be, except for the details of the air draft, of any suitable design, and it can be of one piece, with the tubes 14, or separate as preferred. The air and gas tubes 14 and 15 deliver into and merge into the annular passage 17 which is formed between the wall of the central draft tube 18 and the wall 19 which forms the upper extension of the outer wall of the flues 15 and the air and gas passing up through the draft tube and through the tubes or flues 15 are thus carried forcibly up into and through the mantle 20. The mantle 20 can be of any approved construction, but I prefer to have it open at the top, although my invention has nothing to do with the mantle.

The mantle can be supported in any convenient way, but to show a means of support I have provided a rod 21 which is carried in a holder 22 on the post 23, and this is seated, as shown at 24 (Fig. 1) on top of the bunsen 10. The burner has the customary outer shell 25 in which are the air inlet ports 26 and a chimney support 27 is provided, the walls of which serve to direct the incoming air upward against the mantle, and the chimney support has the ordinary chimney clips 28 which press against and secure the chimney 29.

It will be seen that the air and gas passing up through the bunsen 10 will be thoroughly mingled and will pass on through the flues 14 and extensions 15 thereof and be delivered through the circular vent 17 so as to impinge on all parts of the mantle and combustion will be further promoted by air rushing up through the center tube or draft tube 18 and through the ports 26. If desired, the passage of fuel through the flues can be checked a little, as, for instance, by placing a bent wire 30 (see Fig. 5) in the annular vent or passage way 17. The air passing through the center or draft tube 18 can also be checked and made to impinge in numerous jets upon the mantle by using an improved extension 18ª of the draft tube which extension is provided with numerous perforations, or a wire gauze extension can be used.

In Figs. 7 to 9 I have shown the lamp provided with an air forcing apparatus operated by the draft through the draft tube or center tube and means for supplying the forced air and gas effectively to the mantle. As illustrated, the center or draft tube 18 is projected downward so as to form an extension or casing 31 and this is preferably larger in diameter than the draft tube, is open at the bottom, and is supported on the pipes or tubes 14 which are elongated to provide for the air forcing apparatus. The casing 31 carries a wind wheel 32 which can be of any suitable construction, and this is secured to a shaft 33 which likewise can be mounted in any convenient manner, and which as shown is mounted at the top in a cross bar 34 extending across the top of the casing 31 and at the bottom in a bearing 35 on the top of the bunsen tube 10. The shaft 33 which is driven with the wheel 32 carries the fans 36 of a blower comprising the said fans and a casing 37, but the blower can be of any approved construction, as I do not claim the blower in detail. As shown the blower casing is open at top and bottom, and the air is drawn in through these openings and forced out through the tube 38, as described below. The blower casing 37 has an outlet pipe 38 which delivers into the lower end of the bunsen tube 10 below the openings 12 and so when the lamp is lighted and the draft induced the wind wheel 32 will drive the blower and force an excess air supply into the bunsen tube. I wish it clearly understood that any wind operated motor can be substituted for the wind wheel, and that any approved form of blower can be used. The casing 31 above referred to, is open at the bottom and delivers through pipes or tubes 39 into the lamp at a point between the wall 27 and the wall 19 so that a portion of the air passing from the casing will go through the said tubes 39 and be delivered to the outer side of the mantle, and in order that this action may be certain, the draft tube 18 is as above stated, smaller than the casing 31, though the draft tube and casing form essentially one structure. In this form of the apparatus, where the forced air draft is used, the tubes or pipes 14 are elongated as stated, and they deliver into an annular chamber 15ª at the bottom of the burner and the air and gas pass from this chamber up through the annular passage 17, as already stated, except that the quantity passing is increased. I have found by actual experiment that the quantity of air passing through the draft tube is sufficient to drive the wind motor or wheel 32 at a very high rate of speed, so that it will operate the blower, but if desired, any suitable gearing can be arranged between the wind wheel and blower without affecting the principle of my invention, although, as stated, the right rate of speed of the wind wheel renders the use of gearing superfluous in most cases.

I have shown a burner provided with two tubes 14, or with three tubes, as in Fig. 3, but it will be understood that any number of these tubes can be used, or that a single annular passage might be used for connecting the bunsen with the passage way 17 without affecting the principle of my invention.

From the foregoing description it will be seen that I have produced a lamp which has an unusual air supply, and for this reason it has excellent combustion and high efficiency, and while the form of burner is particularly adapted for lighting purposes, the mantle can be dispensed with and the structure practically as shown used as a heater with excellent results.

Having thus fully described my invention, I claim as new and desire to secure by Letters Patent,—

1. A structure such as described, comprising a burner having a central draft tube, the lower end of said draft tube being enlarged a wall concentric with the draft tube forming a flue between itself and the draft tube, said wall being adapted to enter the lower end of the mantle, a second wall concentric with the first wall and forming a circular flue delivering outside the mantle, tubes delivering air from the enlarged portion of the draft tube to the outer flue, a bunsen tube, tubes delivering air and gas from the bunsen tube to the inner flue, and a motor mounted in the enlarged end of the draft tube and operated by the draft therethrough.

2. A structure such as described comprising a burner having a central draft tube, a wall concentric with the draft tube forming a flue between itself and the draft tube, said wall being adapted to enter the lower end of a mantle, a second wall concentric with and spaced around the first wall and forming a second flue, air connections between the lower part of the draft tube and the second flue, a motor mounted in the draft tube and driven by the draft therethrough, a blower driven by the motor, and a connection between the discharge pipe of the blower and the first flue.

3. A structure such as described, comprising a central draft tube open at both ends, a wall concentric with the draft tube and forming a flue discharging at the top, a second wall around the first wall and forming a second flue between the two, the second flue also delivering at the top, air connections between the lower part of the draft tube and the second flue, a bunsen tube having connections with the first flue, a motor mounted in the draft tube and driven by the draft therethrough, and a blower operated by the motor and discharging into the bunsen tube.

4. A structure such as described comprising a central draft tube open at both ends, a wall surrounding the draft tube and forming a flue discharging at the top, the said wall being adapted to enter the lower end of a mantle, a second wall concentric with the first mentioned wall and forming a second flue delivering outside the mantle, a bunsen tube, pipes leading from the bunsen tube and delivering into the first named flue, pipes leading from the lower part of the draft tube and delivering into the second flue, a motor in the draft tube operated by the draft therethrough, a blower operated by the motor, and a pipe leading from the blower to the lower part of the bunsen tube.

5. A gas lamp having a central draft tube open at the bottom, a wall concentric with and outside of the draft tube around which the mantle fits, said wall forming a flue a second wall outside the mantle and forming a flue, said second wall being inclined towards but terminating a distance from the mantle, a bunsen tube, a series of tubes leading from the bunsen tube to the flue formed around the draft tube, and a blower for creating a draft through the flue formed by the second wall.

6. A gas lamp having a central draft tube open at the bottom, a wall concentric with the outside of the draft tube around which the mantle fits, said wall forming a flue a second wall outside the mantle and forming a flue, said second wall being inclined towards but terminating a distance from the mantle, a bunsen tube, a series of tubes leading from the bunsen tube to the flue formed around the draft tube, and a blower for creating a draft through the flue formed by the second wall and the central draft tube simultaneously.

7. A gas lamp having a central draft tube open at the bottom, a wall concentric with and outside the draft tube around which the mantle fits, a second wall outside the mantle and forming a flue, said second wall being inclined towards but terminating a distance from the mantle, a bunsen tube a series of tubes leading from the bunsen tube to the flue formed around the draft tube, tubes leading from the central draft tube to the flue formed by the second wall and a blower mounted in the central draft tube.

8. A gas lamp having a central draft tube open at the bottom, a wall concentric with and outside the draft tube around which the mantle fits, a second wall outside the mantle and forming a flue, said second wall being inclined towards but terminating a distance from the mantle, a bunsen tube, a series of tubes leading from the bunsen tube to the flue formed around the draft tube, tubes leading from the central draft tube to the flue formed by the second wall, and a suitably operated blower in the central draft tube positioned beneath the tubes connecting the central draft tube with the flue formed by the second wall.

9. A gas lamp having a central draft tube open at the bottom, a wall concentric with and outside the draft tube around which the mantle fits, said wall forming a flue, a second wall arranged around the first named wall and forming a second flue, said second wall being inclined towards the mantle and terminating on a plane flush with the top of the first wall, a bunsen tube and a series of tubes communicating with the bunsen tube and with the flue formed around the draft tube through the bottom of said flue.

10. A gas lamp having a central draft tube open at the bottom, a wall concentric with and outside of the draft tube around which the mantle fits, said wall forming a flue, a second wall arranged around the first named wall and forming a second flue, and a series of tubes communicating with the bunsen tube and with the flue formed around the draft tube through the bottom of said flue, the lower portion of the first named wall being curved to enlarge the flue formed thereby at its base.

11. A gas lamp having a central draft tube opened at the bottom, a wall concentric with and outside the draft tube around which the mantle fits, said wall forming a flue, a bent wire in the flue, a second wall arranged around the first named wall forming a second flue, a bunsen tube and a series of tubes communicating with the bunsen tube and with the flue formed around the draft tube.

ALCORN RECTOR.

Witnesses:
WARREN B. HUTCHINSON,
MARY A. S. MOELLER.